United States Patent [19]

Hussman

[11] Patent Number: 5,182,460
[45] Date of Patent: Jan. 26, 1993

[54] METHOD AND APPARATUS TO REGULATE ILLUMINATION RANGE OF A MOTOR VEHICLE

[75] Inventor: Micha Hussman, Lippstadt, Fed. Rep. of Germany

[73] Assignee: Hella KG Hueck & Co., Lippstadt, Fed. Rep. of Germany

[21] Appl. No.: 737,720

[22] Filed: Jul. 30, 1991

[30] Foreign Application Priority Data

Aug. 6, 1990 [DE] Fed. Rep. of Germany ....... 4024916

[51] Int. Cl.$^5$ .................... B60Q 1/076; B60Q 1/08; B60Q 1/10
[52] U.S. Cl. ......................... 307/10.8; 307/10.1; 307/120; 362/71; 315/82
[58] Field of Search ............... 362/37, 71; 315/77–82; 307/10.8, 120, 121, 9.1, 10.1; 364/424.05; 200/61.89, 61.45 R; 73/510, 511

[56] References Cited

U.S. PATENT DOCUMENTS

| | | | |
|---|---|---|---|
| 3,617,731 | 11/1971 | Fleury | 362/71 |
| 3,643,082 | 2/1972 | Fleury | 362/71 |
| 3,973,114 | 8/1976 | Martin | 362/71 |
| 4,037,134 | 7/1977 | Löper | 315/78 |
| 4,858,080 | 8/1989 | Oikawa | 362/71 |
| 4,870,545 | 9/1989 | Hatanaka et al. | 362/72 |

FOREIGN PATENT DOCUMENTS

3110094A1 9/1982 Fed. Rep. of Germany.
3827983C1 2/1990 Fed. Rep. of Germany.

OTHER PUBLICATIONS

G. Couffinhal et al.; "Lighting Control Devices"; Electronics; London, England; Oct. 29–Nov. 2, 1979; pp. 200–204.

Primary Examiner—A. D. Pellinen
Assistant Examiner—Fritz M. Fleming
Attorney, Agent, or Firm—Griffin, Butler, Whisenhunt & Kurtossy

[57] ABSTRACT

In a method and apparatus to regulate the illumination range of a motor vehicle in which, at a position on a front axle and at a position on a rear axle, signals are measured which are dependent upon the relative positions of a motor-vehicle body to the front axle and the rear axle, with a difference formation between the signal from the front axle and that of the rear axle being accomplished with a resulting difference signal, as a nominal-value signal, being filtered to a first average-value formation. The time for the first average-value formation is determined by a first filter (F1) time constant with positions of adjusting elements being regulated when the first filtered nominal-value deviates from a predetermined, or set, value. Simultaneously with the first average-value formation, a second average-value formation of the nominal-value signal with a second small, or short, filter (F2) time constant, and a third average-value formation of the nominal-value signal with a third, long, filter (F3) time constant takes place. The second, filtered, nominal-value signal is compared with the third, filtered, nominal-value signal, and upon the existence of a difference there between, a regulation from the first, filtered, nominal-value signal is switched over to the third, filtered, nominal-value signal and upon a termination of the difference is again switched over from the third, filtered, nominal-value signal to the first, filtered, nominal-value signal.

11 Claims, 1 Drawing Sheet

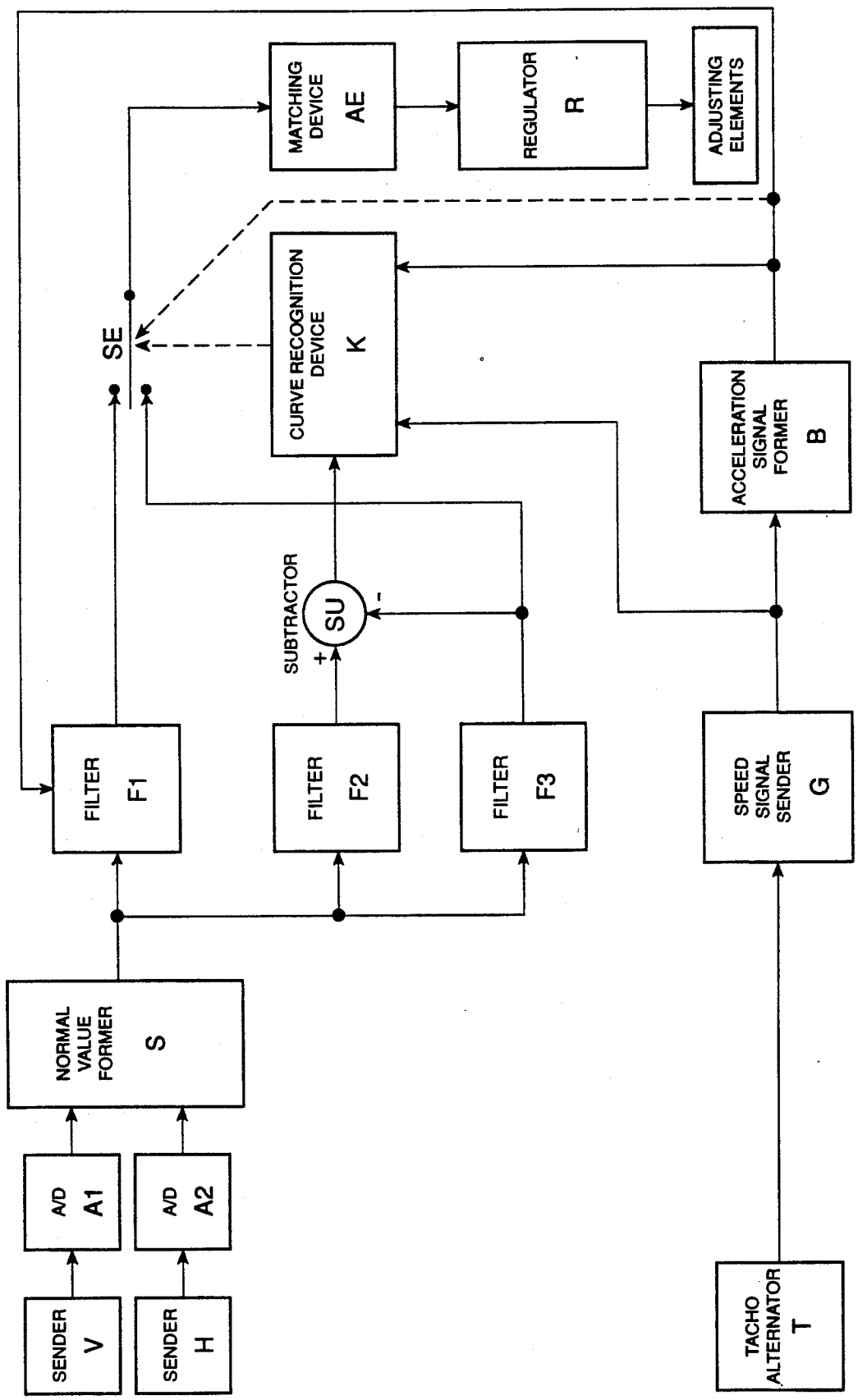

METHOD AND APPARATUS TO REGULATE ILLUMINATION RANGE OF A MOTOR VEHICLE

BACKGROUND OF THE INVENTION

This invention concerns a method to regulate an illuminating range of a motor vehicle in which signals are measured at a position on a front axle and at a position on a rear axle, which signals depend upon a relative position of a motor vehicle body, or chassis, to the front and rear axles, with a difference between these signals being formed as a difference signal, with the resulting difference signal, as a nominal-value signal, being filtered to a first mean, or average, value, with a time for the first average-value formation being determined by a first filter time constant, and with positions of adjusting elements being regulated when the first, filtered, nominal-value signal deviates from a predetermined, or set, value and an apparatus for regulating the illumination range of a motor vehicle.

A method and an apparatus to regulate the illumination range of a motor vehicle of this type is known from German Offenlegungsschrift DE OS 31 10 094 A1.

Sensors which measure the relative position of a body, or chassis, of a motor vehicle to motor-vehicle axles or motor-vehicle wheels, are coupled to an analog multiplexer which feeds signals from the sensors via an analog/digital converter to a microprocessor. A filtering of the available signals results, while in a definite, or set, time period, a mean, or average, value formation of these signals is carried out. For this purpose, the number of measured values to be included is set, or predetermined. From the average values then for each sensor pair, that is, a respective front axle and rear axle sensor, a difference signal is formed that corresponds to a headlight adjustment value. Each of these difference signals is fed to a digital/analog converter which is coupled via a respective subsequent operational amplifier with a headlight adjustment apparatus. Depending upon the sense (plus or minus) of the difference signals, the adjusting elements are thereby moved forwardly or backwardly and headlight position registers in the microprocessor count upwardly or downwardly.

It has proven to be particularly disadvantageous that inclination changes of the motor vehicle body not attributable to changes in loading or road surface unevenness are not recognized so that because the measured signals from the axle sensors corresponding to inclination changes during, for example, driving about a curve, the average-value formation is falsified, whereby, for example, after driving about a curve false adjustments of illumination range are present which can lead to a blinding of oncoming traffic o to reduction in safety whereby dangerous situations during operation of a motor vehicle are brought about.

It has proven to be particularly disadvantageous with the known device that four sensors are provided to determine the relative position of the motor-vehicle body to the motor-vehicle axles or motor-vehicle wheels which are coupled via an analog-multiplexer to a microprocessor, whereby an embodiment associated with high costs result which demands additionally an increased expenditure of time and costs upon manufacture and mounting.

An object of this invention is to provide regulation of a light distance (illumination) range of a motor vehicle which is uncomplicated and cost effective and which recognizes those inclination changes of the motor-vehicle body which are not attributable to changes in load or in road surface unevenness and thereby avoids false adjustments caused by these inclination changes during regulation of the illumination range.

SUMMARY OF THE INVENTION

According to principals of this invention, simultaneous with a first average-value formation a second average-value formation of a nominal-value signal with a second, small, filter time constant and a third average-value formation of the nominal-value signal with a third, long, filter time constant takes place, the thusly-produced second, filtered, nominal-value signal being compared with the thusly-produced third, filtered, nominal-value signal and, upon the presence of a difference between the second, filtered, nominal-value signal and the third, filtered, nominal-value signal, the regulation from the first, filtered, nominal-value signal being switched over to the third, filtered, nominal-value signal and upon termination of a difference being switched back over from the third, filtered, nominal-value signal to the first, filtered, nominal-value signal.

BRIEF DESCRIPTION OF THE DRAWING

The foregoing and other objects, features and advantages of the invention will be apparent from the following more particular description of the preferred embodiment of the invention, as illustrated in the accompanying drawing in which reference characters refer to the same parts throughout the drawing. The drawing is not necessarily to scale, emphasis instead being placed upon illustrating principals of the invention in a clear manner.

The drawing is a block circuit diagram of an apparatus of this invention to regulate the illumination range of a motor vehicle.

DESCRIPTION OF A PREFERRED EMBODIMENT

A front axle sensor sender (a device including or associated with a sensor for sending a sensed signal) V is here coupled with a nominal-value former over a first analog/digital converter A1. The nominal-value former S is additionally coupled with a rear axle sensor sender H over a second analog/digital converter A2. The front axle sender and the rear axle sender produce signals which are functions of the relative position of a motor vehicle body to the front and rear axles. The nominal-value former S forms, or develops, a difference between the signals from the front axle sender V and the rear axle sender H and multiplies the thusly-obtained difference signal, depending upon the chosen embodiment and upon requirements, by a correcting factor. The thusly-formed nominal-value signal is fed to a first filter F1, a second filter F2, and a third filter F3. The first filter F1 carries out a first average-value formation in dependence upon, or as a function of, a first filter time constant which is variable or fixed and which assures that a best possible regulation of the illumination range of the motor vehicle results.

The second filter F2 carries out a second average-value formation with a second, short, filter time constant whereby a second, filtered, nominal-value signal is formed that is to a great extent dependent upon, or a function of, short time changes in the level of the motor-vehicle body. The third filter F3 carries out a third average-value formation which is a function of a third, long, filter time constant and thereby forms a third, filtered, nominal-value signal that is not dependent upon, or substantially dependent upon, short time changes in the level of the motor vehicle body. Thereby, so that short time changes in the level of the motor-vehicle body can be recognized, the second, short, filter time constant is, for example, around one second. So that the third filtered nominal-value will depend very little upon short time changes in the level of the motor vehicle body, the third, long, filter time constant is here, for example, around a few minutes. The filter time constants can, thereby, depending upon application, be chosen to be longer or shorter.

The first filter F1 and the third filter F3 are each connected to a switchover device SE which can connect the first filter or the third filter with the regulator R. The regulator R regulates the position of adjusting elements, which are shown here in block form and which change the positions of headlights.

The second filter F2 and the third filter F3 are electrically conductively coupled with a subtractor SU whereby the second, filtered, nominal-value signal here, for example, is fed to the subtractor with a positive sign (as a positive value) and the third, filtered, nominal-value signal from the third filter F3 is fed to the subtractor here, for example, with a negative sign (as a negative value). The subtractor SU forms the difference between the filtered nominal-value signals of the second filter F2 and the third filter F3. The subtractor SU is electrically conductively coupled with a curve-recognition device K to which the difference signal is fed. The curve-recognition device K is electrically conductively coupled with the switchover device SE and thereby couples the third filter F3 electrically conductively with the regulator R if a difference signal other than zero is fed to it from the subtractor SU. When no difference signal from the subtractor SU is present, the curve-recognition device K switches the switchover device SE so that the first filter F1 is coupled to the regulator R.

The curve-recognition device K is electrically conductively coupled with a speed signal sensor, or sender, G and includes a speed threshold value device which itself affects the switchover such that the third filter F3 is only coupled to the regulator R if a minimum speed of the motor vehicle is exceeded. To form a speed signal, the speed signal sender G is electrically conductively coupled with a tacho-alternator, or tachometer, signal sender T.

The curve recognition device K is additionally electrically conductively coupled with an acceleration signal former B whereby a signal from the acceleration signal former B is used in such a manner that the third filter F3 is only connected with the regulator R if no acceleration of the motor vehicle is present. The acceleration signal former B is additionally electrically conductively coupled with the switchover device SE and always couples, via the switchover device SE, the first filter F1 with the regulator R when an acceleration of the motor vehicle is present. This control can also take place in dependence upon a predetermined threshold value.

Further, the acceleration signal former B, which here, for example, is coupled with the speed signal sender G, for example, is coupled with the first filter F1 and controls this in a manner that the time constant of the first filter F1 is decreased to shorter time periods with increasing positive or negative acceleration of the motor vehicle and is increased to longer time periods with decreasing positive or negative acceleration whereby a best possible regulation of the illumination range, matching the respectively motor vehicle operation conditions, results without a blinding effect or a reduction in safety.

At the coupling between the switchover device SE and the regulator R, a matching device AE is, here for example, arranged which, upon a switchover by the switchover device SE, adjusts the various nominal values to one another so that discontinuities or jumps in the adjustment and regulation of the illumination range are avoided.

By reference to the only figure, the process of regulating an illumination range of a motor vehicle 10 is described in more detail as follows.

The front axle sender V and the rear axle sender H form, or develop, signals which are functions of the relative position of the motor vehicle body to the front axle and the rear axle. These analog signals are converted into digital signals by the analog/digital converter A1, A2 and fed to the nominal-value former S. The nominal-value former S develops the difference between the digital signals from the front axle sender V and the rear axle sender H and multiplies this, depending upon requirements, with a correcting value.

The thusly-formed nominal-value signal is fed to a first filter F1 which by means of a first filter time constant carries out an average-value formation and thereby develops a first, filtered, nominal-value signal. This first, filtered, nominal-value signal is fed to the regulator R to regulate the illumination range of the motor vehicle. In order to achieve a best possible regulation of the illumination range, the first filter time constant of the first filter F1 depends upon, or is a function of, the acceleration of the motor vehicle. With increasing positive or negative acceleration of the motor vehicle, shorter filter time constants are effectively switched in, and with decreasing positive or negative acceleration of the motor vehicle, longer filter time constants are effectively switched in.

Simultaneously with the first average-value formation by the first filter F1, the second filter F2 carries out a second average-value formation, and the third filter F3 carries out a third average-value formation. The second filter F2 has thereby a second, short, filter time constant and forms a second, filtered, nominal-value signal that reproduces short duration changes in the level of the motor vehicle. The third filter F3 has a third, long, filter time constant and forms a third, filtered, nominal-value signal that is independent, or substantially independent, of the short duration changes in the level of the motor vehicle body. By means of a comparison of the second, filtered, nominal-value signal with the third, filtered, nominal-value signal, it can be determined if a difference between these signals is present. A difference, which also depends upon the position and the mounting location of the front axle sender V and the rear axle sender H, is an indication of an inclination change of the motor-vehicle body which is not attributable to a change in loading or to street surface unevenness and, for example, is produced by driving about a curve. If such a difference, for which also a threshold value can be predetermined and applied, is present, the curve recognition device K controls the switchover device SE so that the connection between the first filter F1 and the regulator R is interrupted and the third filter F3 is coupled with the regulator R. If the difference between the second, filtered, nominal-value signal and the third, filtered, nominal-value signal equals zero, the curve recognition device K controls the switchover device SE in such a manner that the connection between the third filter F3 and the regulator is opened and the first filter F1 is placed in connection with the regulator R.

The second filter time constant can, for example, amount to about one second, while the third filter time constant, for example, can be around 3 minutes. These times can, depending upon the application, be smaller or larger. The first filter time constant can, for example, be smaller or equal to the second filter time constant and smaller than the third filter time constant.

Because, depending upon operating conditions of the motor vehicle, the first, filtered, nominal-value signal can be quite different from the third, filtered, nominal-value signal, in addition, depending upon the set second, short, filter time constant the time to recognition, for example, of curve driving, can cause a delay in the switchover of the switchover device SE, the matching device AE is added in the coupling between the switchover device SE and the regulator R which, upon a switchover by the switchover device SE, matches, or adapts, the previous switched in filtered nominal value with the current switched in filtered nominal value to prevent jumps and discontinuities in the adjustment and regulation of the illumination range.

So that at low speeds all inclination, or attitude changes of the, motor-vehicle body will be respected (used for regulating) for regulation umination range, the first filter F1 remains coupled with the regulator R below a minimum speed fixed by the curve recognition device K.

So that also such inclination changes of the motor-vehicle body which are not attributable to acceleration changes will be recognized and false adjustments during regulation of the illumination range because of such inclination changes will be avoided, the third filter F3 is only placed in connection with the regulator when no acceleration of the motor vehicle is present.

In another embodiment of this invention, the digitalized signal of the front axle sender V can be fed directly to the second filter F2, and the digitalized signal of the rear axle send H can be fed directly to the third filter F3 whereby another cost effective apparatus to regulate the illumination range of a motor vehicle results with which the inclination changes of the body, those, for example, caused by driving about a curve, can be recognized in an uncomplicated and cost effective manner and false adjustments of the illumination range thereby caused can be avoided.

It is beneficial that simultaneously with the first average-value formation a second average-value formation of the nominal-value signal with a second, small, filter time constant and a third average-value formation of the nominal-value signal with a third, long, filter time constant takes place because in this manner, in an uncomplicated and cost effective way, a first, filtered, nominal-value signal is produced that depends upon the short time changes of the inclination of the motor-vehicle body and a third, filtered, nominal-value signal is formed which is independent, or substantially independent, from short time inclination changes of the motor-vehicle body.

In that the thusly-created second, filtered, nominal-value signal is compared with the thusly-created third nominal-value signal, the benefit results that in a particularly uncomplicated and cost effective manner inclination changes of the motor vehicle can be determined which are not attributable to changes in loading or to road surface unevenness and which, for example, can be caused by driving about a curve, because with such driving situations, in accordance with a comparison between the measured values at the front axle and the rear axle, a difference between the second, filtered, nominal-value signal and the third, filtered, nominal-value signal is present.

In this connection, it is beneficial that upon the presence of a difference between the second, filtered, nominal-value signal and the third, filtered, nominal-value signal regulation is switched from the first, filtered, nominal-value signal to the third, filtered, nominal-value signal and upon termination of a difference is again switched from the third, filtered, nominal-value signal to the first, filtered, nominal-value signal because in this manner, in an uncomplicated and cost effective manner, upon the presence of an inclination change of the motor vehicle body which is not attributable to a change in loading or to road surface unevenness, the regulation of the illumination range of the motor vehicle, in dependence from the third, long, filter time constant results, whereby the third, filtered, nominal-value signal is independent, or substantially independent, from the disturbing, or distorting, short time inclination changes so that after inclination changes of the motor-vehicle body which, for example, are caused by driving about a curve, false adjustments of the illumination range are not caused which can lead to the blinding of oncoming traffic or to losses in illumination range, which eliminates a danger during operation of a motor vehicle.

In that the first filter time constant is smaller or the same as the second filter time constant and in that the third filter time constant is longer than the second filter time constant, the advantage results that inclination changes in the motor-vehicle body, because of the second, short, filter time constant, will be recognized quite quickly and thereby a very fast switchover upon the existence of such inclination changes from the first, filtered, nominal-value signal to the third, filtered, nominal-value signal results, and the third, filtered, nominal-value signal is independent, or substantially independent, from the short duration inclination changes of the motor-vehicle body, whereby false adjustments of the illumination range upon inclination changes, those, for example, caused by driving about a curve, can be prevented in an uncomplicated and cost effective manner.

It is beneficial that upon the presence of a difference between the second, filtered, nominal-value signal and the third, filtered, nominal-value signal the regulation is only switched over from the first, filtered, nominal-value signal to the third, filtered, nominal-value signal when the motor vehicle has exceeded a minimum speed and/or no positive or negative acceleration of the motor vehicle takes place, because in this manner for one thing it is assured that upon a small speed of the motor vehicle short duration changes in the inclination of the motor-vehicle body upon regulation of the illumination range are respected, and for another thing also such inclination changes of the motor vehicle body, which are not attributable to an acceleration of the motor vehicle, will be recognized and false adjustments upon regulation of the illumination range by thusly-caused inclination changes will be dependably and cost effectively avoided.

Because when a positive or negative acceleration of the motor vehicle is taking place, regulation in dependance upon the first, filtered, nominal-value signal results, the benefit is provided that when an acceleration of the motor vehicle takes place, the regulation of the illumination range in each case results in dependance upon the first, filtered, nominal-value signal whereby it is made certain that the inclination changes caused by an acceleration of the motor vehicle will be respected in the best possible manner upon regulation of the illumination range.

It is beneficial that after a switching over from the first, filtered, nominal-value signal to the third, filtered, nominal-value signal and vice versa a matching of the previously "switched-in" nominal-value signal with the present "switched-in" nominal-value signal takes place because in this manner, in an uncomplicated and cost effective way discontinuities and jumps in the adjustment of the illumination range can be prevented. This is necessary because also when, for example, the second filter time constant, for example, is approximately one second and the third filter time constant, for example, is approximately 30 seconds the time for recognition of an inclination change, which, for example, is caused by driving about a curve, requires about one second and depending upon arrangement of the first filter time constant, upon a reversal, a difference between the first, filtered, nominal-value signal and the third, filtered, nominal-value signal can be present. Upon such a difference, this matching strives for a continuous adapting of the previous "switched-in" nominal-value signal to the current "switched-in" nominal-value signal.

It is particularly beneficial that the first filter time constant of the average-value formation is decreased to a shorter time with increase in positive or negative acceleration of the motor vehicle and that the first filter time constant is increased to a longer time with decreasing positive or negative acceleration of the motor vehicle because in this manner for one thing a dynamic controlling of the illumination range of the motor vehicle is made possible that is particularly uncomplicated and cost effective and with which it is made certain that in all driving situations of the motor vehicle the illumination range is controlled as is best possible, and it is assured that a quick readjustment of the adjusting elements to control the illumination range only results when this is absolutely necessary whereby the life span of the adjusting elements are increased and this can be brought about particularly cost effectively, uncomplicatedly and durably.

According to the apparatus of this invention the object of the invention is solved in that the nominal-value former is coupled with a first filter which has a first filter time constant, in that the nominal-value former is coupled with a second filter having a second, short, filter time constant, in that the nominal-value former is coupled with a third filter having a third, long, filter time constant, in that the first filter or the third filter is coupled via a switchover device with the regulator, in that the second filter and the third filter are coupled with a subtractor, in that the subtractor is coupled with a curve recognition device, and in that the curve recognition device controls the switchover device in such a manner that, upon the existence of a difference between the signals from the second filter and the third filter the third filter is coupled with the regulator and, upon termination of the difference, the regulator is again coupled with the first filter.

It is beneficial that the nominal-value former is coupled with a first filter having a first filter time constant because in this manner in an uncomplicated and cost effective manner a best possible regulation of the illumination range results with a suitable choice of the first filter time constant.

Because the nominal-value former is coupled with a second filter having a second, short, filter time constant, the benefit results that a second, filtered, nominal-value signal is formed that is strongly dependant upon short duration inclination changes of the motor-vehicle body.

It has proven itself to be beneficial that the nominal-value former is coupled with the third filter having the third, long, filter time constant because in this manner a third, filtered, nominal-value signal can be developed that is independent of, or substantially independent of, short duration inclination changes of the motor-vehicle body.

It is beneficial that the first filter or the third filter can be coupled via a switchover device with a regulator because in this manner, depending upon existing operation conditions of the motor vehicle, the regulation of the illumination range can result in dependance upon the first, filtered, nominal-value signal or from the third, filtered, nominal-value signal.

Because the second filter and the third filter are coupled with a subtractor and the subtractor is coupled with a curve recognition device, the benefit results that inclination changes of the motor-vehicle body which are not attributable to changes in loading or to road surface unevenness can be recognized in a particular uncomplicated and cost effective manner because, as a function of the mounting locations of the front axle sender and the rear axle sender, for example, upon driving about a curve, a difference is present at the output of the subtractor which indicates an inclination change in the motor vehicle body which is not a function of loading changes or road surface unevenness. In this connection, it is particularly beneficial that the curve recognition device controls the switchover device in a manner that, upon the presence of a difference between the signals from the second filter and the third filter, the third filter is coupled with the regulator and upon termination of the difference the regulator is again coupled to the first filter because in this manner, in a particularly uncomplicated and cost effective way, upon recognition of an inclination change which is not caused by loading and/or road surface unevenness, regulation of the illumination range based on the third, long, filter time constant and the thereby-formed third, filtered, nominal-value signal, results and not regulation based on the first, filtered, nominal-value signal which, depending upon the duration and the manner of the inclination change, can be falsified by the thusly-caused inclination changes, so that a regulation of the illumination range in dependance upon the third, filtered, nominal-value signal will prevent false adjustments of the illumination range which, after, for example, driving about a curve, can cause a blinding of oncoming traffic or loss of vision range and dangerous situations upon operation of a motor vehicle.

It is beneficial that the first filter time constant is smaller or equal to the second filter time constant and that the third filter time constant is longer than the second filter time constant because in this manner for one thing it is made certain that inclination changes in the motor-vehicle body which are not attributable to changes in loading, or road surface unevenness, will be recognized in the quickest possible manner, and for another thing the third filter nominal-value signal will be made available which is independent, or substantially independent, from short duration changes in the inclination of the motor-vehicle body and because of this a regulation of the illumination range can result which avoids false adjustments as best possible.

Because the curve recognition device is connected with a speed signal sender and is coupled with the acceleration signal former, or sender, and because the curve recognition device includes a speed threshold value device, the benefit results that for one thing upon small speeds of the motor vehicle, the regulation always results in dependance upon the first, filtered, nominal-value signal whereby a best possible adjustment of the illumination range for all inclination changes of the motor vehicle body results, and for another thing also, such inclination changes of the motor-vehicle body, which are not attributable to changes in acceleration, are safely and dependably recognized and, upon reversing, can be respected whereby false adjustments of the illumination range can be avoided even better.

Because the switchover device is coupled with the acceleration signal former which couples the regulator via the switchover device with the first filter when an acceleration of the motor vehicle is present, the benefit results that upon the presence of an acceleration of the motor vehicle the regulation of the illumination range is always a function of the first, filtered, nominal-value signal whereby a best possible short time regulation of the illumination range upon acceleration-caused inclination changes of the motor-vehicle body are achieved.

It is particularly beneficial that the acceleration signal former is coupled with the first filter and that the first filter time constant is reduced to a shorter time with increase in positive or negative acceleration of the motor vehicle and is increased to longer time with decrease in positive or negative acceleration because in this manner, in a particularly uncomplicated and cost effective manner, it is assured that, in dependance upon all appearing driving situations, a dynamic regulation of the illumination range results which best fits the particular operation condition of the motor vehicle. Thus, upon large positive or negative accelerations of the motor vehicle, shorter filter time constants are made effective which assure that the great inclination changes which arise during large acceleration periods of the motor-vehicle body during regulation of the illumination range are as quickly as possible respected and "balanced out".

It has proven to be particularly beneficial that, upon the presence of only small acceleration or no acceleration of the motor vehicle, the regulation of the illumination range is a function of long filter time constants whereby the life spans of the adjusting elements for adjusting the illumination range are increased and these can additionally be constructed cost effectively, as uncomplicatedly and durably as possible.

The embodiments of the invention in which an exclusive property or privilege are claimed are defined as follows:

1. Method to regulate an illumination range of a motor vehicle in which signals are measured from a position on a front axle and a position on a rear axle which depend upon a relative position of a motor-vehicle body to the front axle and the rear axle, with a difference signal formation between the signal of the front axle and that of the rear axle being accomplished, the resulting difference signal, as a nominal-value signal, being filtered to a first, average, nominal value, whereby a time for development of the first, average, nominal value is determined by a first filter time constant, with portions of adjusting elements being thereby regulated when the first, filtered, nominal value deviates from a predetermined set value, wherein the improvement that: simultaneously with formation of the first, average, nominal value, producing a second average value of the nominal-value signal with a second, short, filter time constant and a third average value of the nominal-value signal with a third, long, filter time constant; comparing the thusly-produced second, filtered, nominal-value signal with the thusly-produced third, filtered, nominal-value signal; and, upon the presence of a difference between the second, filtered, nominal-value signal and the third, filtered, nominal-value signal, switching the regulation from the first, filtered, nominal-value signal over to the third, filtered, nominal-value signal and, upon a termination of said difference, gain switching regulation over from the third, filtered, nominal-value signal to the first, filtered, nominal-value signal.

2. Method as in claim 1 wherein the first filter time constant is shorter or equal to the second filter time constant and the third filter time constant is longer that the second filter time constant.

3. Method as in claim 2 wherein upon the presence of a difference between the second, filtered, nominal-value signal and the third, filtered, nominal-value signal the regulation is only then switched over from the first, filtered, nominal-value signal to the third, filtered, nominal-value signal if the motor vehicle has exceeded a minimum speed and/or no positive or negative acceleration of the motor vehicle is present.

4. Method as in claim 3 wherein upon the presence of a positive or negative acceleration of the motor vehicle the regulation is accomplished as a function of the first, filtered,, nominal-value signal.

5. Method as in claim 4 wherein after the switching over from the first, filtered, nominal-value signal to the third, filtered, nominal-value signal, and vice versa, a step of matching a current "switched-in" nominal-value signal to a previously "switched-in" nominal value signal is carried out to avoid discontinuities.

6. Method according to claim 5 wherein is further included the step of reducing the first filter time constant of the average-value formation to a o shorter time with increase in positive or negative acceleration of the motor vehicle and increasing the first filter time constant to a longer time with decreasing positive or negative acceleration.

7. Apparatus for regulating the illumination range of a motor vehicle with a front axle sender and a rear axle sensor sender which produces signals in dependance upon the position of a motor-vehicle body to the front axle and the rear axle, said apparatus having a nominal-value developer which develops a difference between signals from the front axle sender and the rear axle sender, with at least one first filter which carries out an averaging of the difference nominal value and with a regulator which, in dependance upon the filtered nominal value, regulates positions of adjusting elements for adjusting the illumination range of the motor vehicle, said apparatus further including the improvement: that the nominal-value developer is coupled with first filter having a first filter time constant; that the nominal-value developer is coupled with a second filter having a second, short, filter time constant; that the nominal- value developer is coupled with a third filter having a third, long, filter time constant; that the first filter or the third filter can be coupled via a switchover device with the regulator; that the second filter and the third filter are coupled with a subtractor; that the subtractor is coupled with a curve recognition device; and that the curve recognition device, upon the presence of a difference between the signals from the second filter and the third filter, controls the switchover device so that the third filter is coupled with the regulator and upon termination of the difference so that the regulator is again coupled with the first filter.

8. Apparatus according to claim 7 wherein the first filter time constant is smaller or equal to the second filter time constant and the third filter time constant is longer than the second filter time constant.

9. Apparatus as in claim 8 wherein the curve recognition device is coupled with a speed signal sender and is coupled with an acceleration signal sender and wherein the curve recognition device includes a speed threshold value device.

10. Apparatus according to claim 9 wherein the switchover device is coupled with an acceleration signal former which couples the regulator via the switchover device with the first filter when an acceleration of the motor vehicle is present.

11. Apparatus as in claim 10 wherein the acceleration signal former is coupled with the first filter and the first filter time constant is decreased to a shorter time with increasing positive or negative acceleration of the motor vehicle and is increased to a longer time with decreasing positive or negative acceleration.

* * * * *